US012649656B2

(12) United States Patent
Liu et al.

(10) Patent No.: US 12,649,656 B2
(45) Date of Patent: Jun. 9, 2026

(54) LOOPING REACTION HYDROGEN PRODUCTION SYSTEM AND HYDROGEN PRODUCTION METHOD

(71) Applicant: DONGFANG BOILER GROUP CO., LTD., Zigong (CN)

(72) Inventors: Xinglei Liu, Zigong (CN); Weicheng Li, Zigong (CN); Qi Zhou, Zigong (CN); Geng Wei, Zigong (CN); Xu Zhou, Zigong (CN); Chunhong Mo, Zigong (CN)

(73) Assignee: DONGFANG BOILER GROUP CO., LTD., Zigong (CN)

( * ) Notice: Subject to any disclaimer, the term of this patent is extended or adjusted under 35 U.S.C. 154(b) by 502 days.

(21) Appl. No.: 18/179,843

(22) Filed: Mar. 7, 2023

(65) Prior Publication Data

US 2023/0219811 A1     Jul. 13, 2023

Related U.S. Application Data

(63) Continuation-in-part of application No. PCT/CN2021/093557, filed on May 13, 2021.

(30) Foreign Application Priority Data

Sep. 7, 2020    (CN) .......................... 202010926264.5

(51) Int. Cl.
*C01B 3/10* (2026.01)
*C10J 3/04* (2006.01)
*C10J 3/72* (2006.01)

(52) U.S. Cl.
CPC ................... *C01B 3/10* (2013.01); *C10J 3/04* (2013.01); *C10J 3/725* (2013.01);
(Continued)

(58) Field of Classification Search
CPC .......... C10J 2300/0916; C10J 2300/093; C10J 2300/0943; C10J 2300/0969;
(Continued)

(56) References Cited

U.S. PATENT DOCUMENTS 2,449,635 A * 9/1948 Barr ........................ C01B 3/061
                                                423/658
2,614,067 A * 10/1952 Reed ........................ C10J 3/482
                                                208/143

(Continued)

FOREIGN PATENT DOCUMENTS

CN          101100284 A     1/2008
CN          101870455 A     10/2010
(Continued)

OTHER PUBLICATIONS

Machine Translation of CN-109704276-A (Oct. 24, 2025) (Year: 2025).*

*Primary Examiner* — Matthew J Merkling
(74) *Attorney, Agent, or Firm* — NKL Law; Allen Xue

(57)          ABSTRACT

A looping reaction hydrogen production system includes a reduction reaction device, a primary separation device, a hydrogen production reaction device, a secondary separation device, a primary heat transfer device and a cooling purification device. Based on looping combustion reaction mechanism, the system makes MeO/Me circularly flow between the hydrogen production reaction device and the reduction reaction device to respectively generate a reduction/oxidation chemical reaction, and to convert the conventional carbon-based solid fuel into the high-purity clean hydrogen energy. Compared with the conventional hydrogen production technology from water-gas shift reaction of syngas, the system reduces water consumption, energy consumption and environmental pollution of the hydrogen production process; converts conventional carbon-based fuel
(Continued)

into clean hydrogen energy by use of renewable energy sources, such as solar energy; and achieves efficient capture and storage of gaseous $CO_2$.

5 Claims, 1 Drawing Sheet

(52) U.S. Cl.
CPC .................. *C01B 2203/0277* (2013.01); *C01B 2203/0495* (2013.01); *C01B 2203/0827* (2013.01); *C01B 2203/0833* (2013.01); *C01B 2203/0855* (2013.01); *C01B 2203/0866* (2013.01); *C01B 2203/1047* (2013.01); *C01B 2203/148* (2013.01); *C01B 2203/86* (2013.01); *C10J 2300/0916* (2013.01); *C10J 2300/093* (2013.01); *C10J 2300/0943* (2013.01); *C10J 2300/0969* (2013.01); *C10J 2300/0986* (2013.01); *C10J 2300/1612* (2013.01); *C10J 2300/1815* (2013.01)

(58) Field of Classification Search
CPC ........ C10J 2300/0986; C10J 2300/1612; C10J 2300/1815; C10J 3/04; C10J 3/725; C01B 2203/0277; C01B 2203/0495; C01B 2203/0827; C01B 2203/0833; C01B 2203/0855; C01B 2203/0866; C01B 2203/1047; C01B 2203/148; C01B 2203/86; C01B 3/105

See application file for complete search history.

(56) References Cited

U.S. PATENT DOCUMENTS

| | | | | |
|---|---|---|---|---|
| 4,343,624 A * | 8/1982 | Belke | ....................... | C10J 3/503 422/142 |
| 6,494,153 B1 * | 12/2002 | Lyon | .................... | F23C 10/005 60/39.12 |
| 7,767,191 B2 * | 8/2010 | Thomas | ................... | C22B 5/10 423/657 |
| 2005/0175533 A1 * | 8/2005 | Thomas | ................... | C01B 3/50 423/657 |
| 2009/0000194 A1 * | 1/2009 | Fan | ........................... | C01B 3/16 48/199 R |
| 2009/0020405 A1 * | 1/2009 | Fan | ........................... | F23G 5/32 201/31 |
| 2012/0167808 A1 * | 7/2012 | Beal | ..................... | F23C 10/002 110/301 |
| 2018/0297841 A1 | 10/2018 | Garrido Escudero | | |

FOREIGN PATENT DOCUMENTS

| | | | |
|---|---|---|---|
| CN | 109704276 A | * | 5/2019 |
| CN | 112079333 A | | 12/2020 |

* cited by examiner

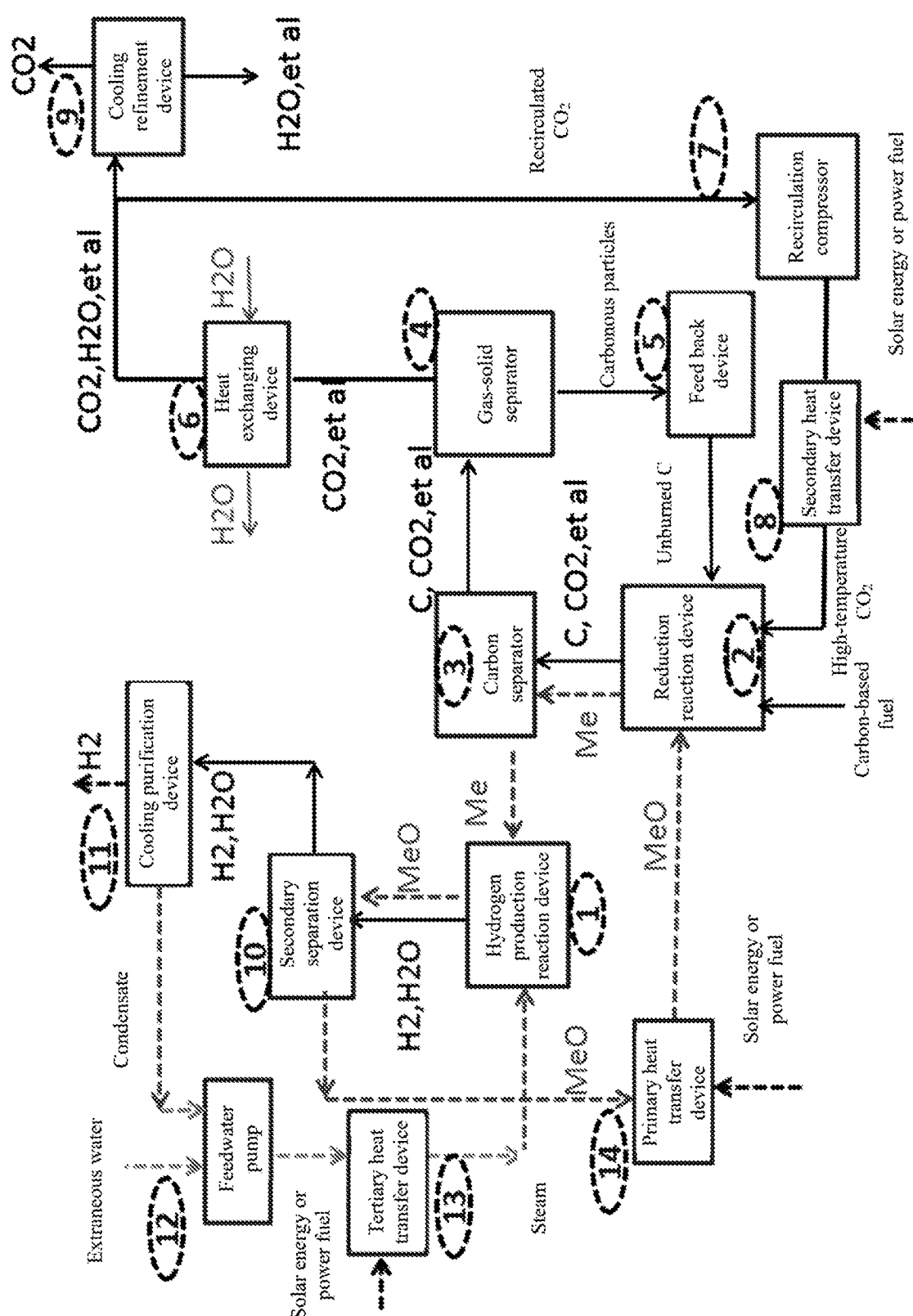

LOOPING REACTION HYDROGEN PRODUCTION SYSTEM AND HYDROGEN PRODUCTION METHOD

TECHNICAL FIELD

The present invention relates to the technical field of hydrogen production, in particular to a looping reaction hydrogen production system and a hydrogen production method based on the looping combustion reaction mechanism.

BACKGROUND $CO_2$ is the main greenhouse gas leading to global warming and it is mostly sourced from the conventional fossil fuel combustion. Nowadays, people pay increasing attention to the development and utilization of renewable energies to reduce the damage to human and environment by pollutants generated in use of the energy. As an ideal secondary energy source, hydrogen energy is clean and pollution-free and releases high heat, so it is regarded as one of the most potential energy sources in the future. With decreasing fossil energy resources and increasing concern about the environmental impact caused by global warming, the energy industry needs to find a new solution to overcome these challenges and reduce the adverse impact on environment of conventional $CO_2$-generated fuel combustion. In the long term, hydrogen production technologies powered by renewable energies such as bioenergy, solar energy and wind energy will trend up and become the mainstream in the market. The hydrogen production methods mainly include water-electrolytic hydrogen production, coal hydrogen production, biomass hydrogen production and syngas steam conversion reaction for hydrogen production. They have the problems of harsh reaction conditions, high energy consumption and difficulty in industrialization. The solid-fuel hydrogen production processes are mainly composed of raw material gasification, CO steam shift, pressure swing adsorption and waste heat recovery. As the reversible CO steam shift reaction is subjected to thermodynamic equilibrium, the problems of high energy consumption, low conversion rate and selectivity and low hydrogen purity widely exist in hydrogen production processes of prior art, and subsequent product separation and purification are required to obtain hydrogen. The cryogenic separation and pressure swing adsorption at home and abroad may purify the product to obtain $H_2$ with a purity of more than 99%, but their processes are complicated and at extremely high cost. It is the key to solve the energy and environmental problems by following the technology route that combines the new clean energy preparation and utilization with the renewable energies to realize high-efficiency and low-cost hydrogen production.

SUMMARY

To overcome the shortcomings of the prior art, the present invention provides a looping reaction hydrogen production system and a hydrogen production method which converts the conventional carbon-based solid fuel into high-purity clean hydrogen energy and achieves efficient capture and storage of gaseous product $CO_2$.

To this end, an aspect of the present invention provides a looping reaction hydrogen production system, which includes:

a reduction reaction device in which high-temperature MeO undergoes a reduction reaction with CO reducing gas generated by a reaction of high-temperature $CO_2$ with carbon-based fuel to obtain a Me-containing solid product and a $CO_2$-containing gaseous product;

a primary separation device receiving the solid product and the gaseous product from the reduction reaction device and conducting separation to obtain the Me, carbonous particles and $CO_2$-containing reaction product syngas;

a hydrogen production reaction device receiving the Me from the primary separation device, in which the Me undergoes an oxidation reaction with high-temperature steam to obtain a MeO-containing solid product and an $H_2$-containing gaseous product;

a secondary separation device receiving the solid product and the gaseous product from the hydrogen production reaction device and conducting separation to obtain the MeO and the $H_2$-containing gaseous product;

a primary heat transfer device receiving the MeO from the secondary separation device and extraneous MeO, heating, and transporting to the reduction reaction device;

a cooling purification device receiving the gaseous product from the secondary separation device and conducting separation to obtain the $H_2$;

wherein, the MeO is an oxidized metal oxide, and the Me is a reduced metal or a reduced metal oxide. Further, the primary separation device includes a carbon separator and a gas-solid separator, the carbon separator is connected with the reduction reaction device to achieve effective separation of the metal oxide Me from the carbonous particles and the $CO_2$-containing reaction product syngas, and the gas-solid separator is connected with the carbon separator to achieve effective separation of the carbonous particles from the $CO_2$-containing reaction product syngas.

Further, the looping reaction hydrogen production system also includes a feedback device connected with the primary separation device and the reduction reaction device, and the feedback device receives the carbonous particles from the primary separation device and returns them to the reduction reaction device.

Further, the looping reaction hydrogen production system also includes a heat exchanging device connected with the primary separation device, the heat exchanging device receives the reaction product syngas from the primary separation device and controls the heat exchange between the reaction product syngas and water/steam medium to obtain low-temperature reaction product syngas and high-temperature water/steam medium.

Further, the gas outlet of the heat exchanging device is divided into two paths, one of which is connected with a cooling refinement device to purify and recover part of $CO_2$ in the low-temperature reaction product syngas, and the other of which is connected with a recirculation compressor and a secondary heat transfer device to pressurize and heat the remaining low-temperature reaction product syngas and transport to the reduction reaction device as high-temperature $CO_2$.

Further, the looping reaction hydrogen production system also includes a feedwater pump and a tertiary heat transfer device connected with the feedwater pump and the hydrogen production reaction device, the tertiary heat transfer device receives water from the feedwater pump, heats and transports the obtained high-temperature steam to the hydrogen production reaction device.

Further, the cooling purification device is connected with the feedwater pump, and the feedwater pump receives extraneous water and condensate from the cooling purification device and sends to the tertiary heat transfer device as feed water.

A further aspect of the present invention provides a looping reaction hydrogen production method for preparing hydrogen by use of the looping reaction hydrogen production system, which includes the following steps:

S1: feeding high-temperature $CO_2$, carbon-based fuel and high-temperature MeO into a reduction reaction device, performing a reaction to obtain a Me-containing solid product and a $CO_2$-containing gaseous product;

S2: conducting separation on the Me-containing solid product and the $CO_2$-containing gaseous product by use of a primary separation device to obtain Me, carbonous particles and $CO_2$-containing reaction product syngas;

S3: sending high-temperature steam and the obtained Me into a hydrogen production reaction device, performing a reaction to obtain a MeO-containing solid product and an $H_2$-containing gaseous product;

S4: conducting separation on the obtained MeO-containing solid product and the $H_2$-containing gaseous product by use of a secondary separation device to obtain MeO and the $H_2$-containing gaseous product; and S5: cooling and clarifying the $H_2$-containing gaseous product to obtain the hydrogen, and sending the high-temperature MeO obtained by heating the obtained MeO and extraneous MeO into the reduction reaction device by use of a primary heat transfer device, and repeating the steps S1 to S5 in turn. Further, after heat exchange with the $CO_2$-containing reaction product syngas obtained in the step S2, part of the obtained $CO_2$-containing reaction product syngas is cooled and purified, and the remaining part is compressed and heated, and then sent into the reduction reaction device as the high-temperature $CO_2$;

the carbonous particles obtained in the Step S2 are returned to the reduction reaction device; and the condensate obtained by cooling and clarifying the $H_2$-containing gaseous product in the Step S4 is heated together with the extraneous water and sent to the hydrogen production reaction device as the high-temperature steam.

Further, the carbon-based fuel is coal, biomass or petroleum coke, the MeO is $Fe_3O_4$ or FeO, and the Me is FeO or Fe; and solar energy or power fuel is used as a heat source to obtain the high-temperature MeO at 800-1100° C., the high-temperature $CO_2$ at 300-450° C. and the high-temperature steam at 150-300° C. separately.

Compared with the prior art, the present invention has the following beneficial effects:

1) Compared with the conventional hydrogen production technology from water-gas shift reaction of syngas, the present invention reduces water consumption, energy consumption and environmental pollution of the hydrogen production process.

2) The present invention converts conventional carbon-based fuel into clean hydrogen energy by use of renewable energy sources, such as solar energy; and achieves efficient capture and storage of gaseous $CO_2$.

3) The metal oxide of the present invention is recirculated through the looping reaction to achieve the low-cost, sustainable and stable production of hydrogen.

BRIEF DESCRIPTION OF THE DRAWING

The FIGURE is a structural diagram of a looping reaction hydrogen production system according to an exemplary embodiment of the present invention.

DESCRIPTION OF REFERENCE NUMERALS IN ATTACHED DRAWING

1—hydrogen production reaction device, 2—reduction reaction device, 3—carbon separator, 4—gas-solid separator, 5—feedback device, 6—heat exchanging device, 7—recirculation compressor, 8—secondary heat transfer device, 9—cooling refinement device, 10—secondary separation device, 11—cooling purification device, 12—feedwater pump, 13—tertiary heat transfer device, 14—primary heat transfer device.

DETAILED DESCRIPTION OF EMBODIMENTS

All of the features disclosed in the Description, or all of the steps of any method or process so disclosed, may be combined in any way, except combinations where such features and/or steps are mutually exclusive.

Any feature disclosed in the Description can be replaced with other equivalent or similar features, unless otherwise specified. That is, each feature is only an example of series of equivalent or similar features, unless otherwise specified.

In order to solve the problems in the prior art, based on the looping combustion reaction mechanism, the present invention achieves the efficient capture and storage of gaseous product $CO_2$ by converting the conventional carbon-based solid fuel into the high-purity clean hydrogen energy, and prepares high-quality water/steam for production heating or power generation by use of the physical sensible heat of the high-temperature gas generated by the reaction.

A looping reaction hydrogen production system of the present invention will be described in detail below. Wherein, the equations of main looping chemical reactions in the looping reaction hydrogen production system are as follows:

reduction reaction: $C+CO_2+2MeO====2Me+2CO_2$,
$\Delta H,_C=Q_1$ KJ/mol     (endothermic reaction);

hydrogen production reaction: $Me+$
$H_2O====H_2+MeO$, $\Delta H,_{H2}=$
$Q_2$ KJ/mol     (endothermic or exothermic reaction);

integrated reaction: $C+CO_2+2H_2$
$O====2H_2+2CO_2$     (endothermic reaction), wherein, the MeO is an oxidized metal oxide, such as $Fe_3O_4$ or FeO; the Me is a reduced metal or a reduced metal oxide, such as FeO or Fe.

As shown above, the overall chemical reaction integrating the looping combustion reactions is an endothermic reaction, so it is necessary to provide heat for the looping hydrogen production system by use of other kinds of energy (such as solar energy or power fuel).

The FIGURE is a structural diagram of a looping reaction hydrogen production system according to an exemplary embodiment of the present invention.

Referring to the FIGURE, according to the exemplary embodiment of the present invention, the looping reaction hydrogen production system includes a reduction reaction device 2, a primary separation device, a hydrogen production reaction device 1, a secondary separation device 10, a primary heat transfer device 14, a cooling purification device 11 and other components, makes oxidized metal oxide MeO/reduced metal or reduced metal oxide Me circularly flow between the hydrogen production reaction device 1 and the reduction reaction device 2 to respectively generate an oxidation chemical reaction and a reduction chemical reaction, and prepares hydrogen by use of carbon-based fuel to achieve efficient and clean utilization of the energy resources.

Particularly, the reduction reaction device 2 is the main component for realizing a reduction reaction on the MeO, and it may be an existing device, such as a fluidized bed. High-temperature MeO undergoes a reduction reaction in the reduction reaction device 2 with CO reducing gas generated by a reaction of high-temperature $CO_2$ with the carbon-based fuel to obtain a Me-containing solid product and a $CO_2$-containing gaseous product.

The carbon-based fuel of the present invention is coal, biomass, petroleum coke and the like, and the CO reducing gas is produced by reaction of the high-temperature $CO_2$ at 300-450° C. with the carbon-based fuel; the CO reducing gas and a small amount of volatile gas (e.g., CO, $H_2$ and $CH_4$) generated from the carbon-based fuel undergo the reduction reaction with the high-temperature MeO at 800-1100° C. to reduce the oxidized metal oxide MeO to the reduced metal or reduced metal oxide Me. In addition, some unburned carbonous particles and generated gaseous products such as $CO_2$ and $H_2O$ (a small amount) are produced.

The primary separation device receives the solid product and the gaseous product from the reduction reaction device 1 and conducts separation to obtain Me, carbonous particles and $CO_2$-containing reaction product syngas.

Particularly, the primary separation device includes a carbon separator 3 and a gas-solid separator 4. The carbon separator 3 is connected with the reduction reaction device 2 to achieve effective separation of the metal oxide Me from the carbonous particles and the $CO_2$-containing reaction product syngas, to be specific, to achieve effective separation of the reduced metal or reduced metal oxide Me from the unburned carbonous particles, and the obtained reduced metal or reduced metal oxide Me is sent to the hydrogen production reaction device 1 for subsequent reactions, and the reaction product syngas (mostly $CO_2$, with a small amount of $H_2O$ and other impurities) and the carbonous particles (unburned C) are lifted to the gas-solid separator 4; the gas-solid separator 4 is connected with the carbon separator 3 to achieve effective separation of the carbonous particles from the $CO_2$-containing reaction product syngas, namely, gas-solid separation. Optionally, the carbon separator 3 can be a spouted bed device, and the gas-solid separator 4 can be a cyclone separator. Referring to the FIGURE, preferably, the looping reaction hydrogen production system also includes a feedback device 5 connected with the primary separation device and the reduction reaction device 2, and the feedback device 5 receives the carbonous particles from the primary separation device and returns the carbonous particles to the reduction reaction device 2 to continue the reduction reaction with the high-temperature $CO_2$.

Further, the looping reaction hydrogen production system also includes a heat exchanging device 6 connected with the primary separation device, the heat exchanging device 6 receives the reaction product syngas from the primary separation device and controls the heat exchange between the reaction product syngas and water/steam medium to obtain low-temperature reaction product syngas and high-temperature water/steam medium. Optionally, the heat exchanging device 6 can be a tubular heat exchanging device, and the obtained high-temperature water/steam medium can be used for production heating or power generation.

Preferably, the gas outlet of the heat exchanging device is divided into two paths. One is connected with a cooling refinement device 9 to purify and recover part of $CO_2$ in the low-temperature reaction product syngas for further recycling, and the other is connected with a recirculation compressor 7 and a secondary heat transfer device 10 to pressurize and heat the remaining low-temperature reaction product syngas and transport to the reduction reaction device 2 to participate in the reaction as high-temperature $CO_2$, thus achieving $CO_2$ recycling.

The hydrogen production reaction device of the present invention receives the Me from the primary separation device, in which the Me undergoes an oxidation reaction with the high-temperature steam to obtain a MeO-containing solid product and an $H_2$-containing gaseous product. Optionally, the hydrogen production reaction device is a bubbling fluidized bed.

The secondary separation device 10 receives the solid product and the gaseous product from the hydrogen production reaction device 1 and conducts separation to obtain the MeO and the $H_2$-containing gaseous product. Preferably, the secondary separation device 10 is a gas-solid separation device, such as a cyclone separator.

The primary heat transfer device 14 receives the MeO from the secondary separation device 10 and extraneous MeO, heats, and transports it to the reduction reaction device 1 to participate in the reduction reaction. The primary heat transfer device 14 provides stable energy for the oxidation-reduction reaction in the looping hydrogen production system. The cooling purification device 11 receives the gaseous product from the secondary separation device 10 and conducts separation to obtain the $H_2$. That is, for the gaseous product from the secondary separation device 10, $H_2O$ is condensed to get high-purity hydrogen.

In addition, the looping reaction hydrogen production system also includes a feedwater pump 12 and a tertiary heat transfer device 13 connected with the feedwater pump 12 and the hydrogen production reaction device 1, the tertiary heat transfer device 13 receives water from the feedwater pump 12, heats and transports the obtained high-temperature steam to the hydrogen production reaction device 1 to participate in the reaction as the raw material.

The cooling purification device 11 is connected with the feedwater pump 12, and the feedwater pump 12 receives extraneous water and the condensate from the cooling purification device 11 and sends to the tertiary heat transfer device 13 as feed water. As a result, the condensate from the cooling purification device 11 and the extraneous water pass through the feedwater pump 12 and the secondary heat transfer device 13 sequentially, and then enter the hydrogen production reaction device 1 to participate in the reaction in the form of steam.

Wherein, preferably, the primary heat transfer device 14, the secondary heat transfer device 8 and the tertiary heat transfer device 13 of the present invention are solar heat transfer devices by use of the solar energy or power fuel heat transfer devices by use of the power fuel. According to the present invention, the solar energy or the power fuel is used to provide heat for the looping hydrogen production system to realize high-efficiency and low-cost hydrogen production.

When the system is used, the high-temperature MeO and the carbon-based fuel undergo the reduction reaction in the reduction reaction device 2 to produce the solid products (mostly, the Me) and the gaseous products (mostly, the $CO_2$); the Me is separated from the carbonous particles and other impurities in the carbon separator, the obtained Me undergoes the oxidation reaction with the steam to produce the MeO and the $H_2$ in the hydrogen production reaction device, and the gas (hydrogen and steam) is separated from the MeO in the secondary separation device, then the MeO is sent to the reduction reaction device after heating in the primary heat transfer device; the gas (hydrogen and steam) is clarified in the cooling purification device to obtain the high-purity hydrogen, and the condensate is heated by the feedwater pump and the tertiary heat transfer device, and then sent to the hydrogen production reaction device; the separated carbonous particles are returned to the reduction reaction device through the feedback device, and the high-temperature $CO_2$ and other gases transfer heat to the water/steam medium through the heat exchanging device to generate high-quality water/steam; and the low-temperature gases including $CO_2$ are pressurized by the recirculation compressor and heated by the secondary heat transfer device, and then introduced into the reduction reaction device.

The present invention further provides a looping reaction hydrogen production method for preparing hydrogen by use of the looping reaction hydrogen production system, which includes the following steps:

S1: high-temperature $CO_2$, carbon-based fuel and high-temperature MeO are fed into a reduction reaction device 2 to obtain a Me-containing solid product and a $CO_2$-containing gaseous product through reaction. Wherein, the carbon-based fuel is coal, biomass or petroleum coke, the MeO is $Fe_3O_4$ or FeO, and the Me is FeO or Fe.

S2: separation is conducted on the Me-containing solid product and the $CO_2$-containing gaseous product by use of a primary separation device to obtain Me, carbonous particles and $CO_2$-containing reaction product syngas; wherein, after heat exchange with the obtained $CO_2$-containing reaction product syngas, part of the obtained $CO_2$-containing reaction product syngas is cooled and purified, and the remaining part is compressed and heated, and then sent into the reduction reaction device as the high-temperature $CO_2$, and the obtained carbonous particles are returned to the reduction reaction device.

S3: the high-temperature steam and the obtained Me is sent into a hydrogen production reaction device 1 to obtain a MeO-containing solid product and an $H_2$-containing gaseous product through reaction.

S4: separation is conducted on the obtained MeO-containing solid product and the $H_2$-containing gaseous product by use of a secondary separation device 10 to obtain MeO and the $H_2$-containing gaseous product; wherein, condensate obtained by cooling and clarifying the $H_2$-containing gaseous product is heated together with extraneous water and sent to the hydrogen production reaction device as the high-temperature steam.

S5: the $H_2$-containing gaseous product is cooled and clarified to obtain the hydrogen, and the high-temperature MeO obtained by heating the obtained MeO and extraneous MeO is sent into the reduction reaction device 1 by use of a primary heat transfer device 14, and the steps S1 to S5 are repeated in turn.

With this method, the solar energy or the power fuel is used as a heat source to obtain the high-temperature MeO at 800-1100° C., the high-temperature $CO_2$ at 300-450° C. and the high-temperature steam at 150-300° C. separately. According to the present invention, a circulating flux of the MeO/Me and an addition ratio of the carbon-based fuel are adjusted to control the reduction degree of the oxidized metal oxide, and a steam flow to the hydrogen production reaction device is regulated to control the oxidation degree of the reduced metal or the reduced metal oxide, so as to control the whole system and produce the hydrogen.

The present invention will be further described in detail with reference to an embodiment.

Referring to the FIGURE, the embodiment includes: a $Fe_3O_4$/FeO granular metal oxide with a particle size ranging from 125 μm to 180 μm is used as a circulating medium, with a mass fraction of $Fe_3O_4$ being 30%, and lignite is used as carbon-based fuel.

A reduction reaction device: the lignite is sent into a high-temperature reduction reaction device at 1000° C. to produce coal gas (e.g., $H_2$/CO) and coke by destructive distillation; the coke undergoes a reduction reaction with high-temperature $CO_2$ to form CO reducing gas; as inside the reduction reaction device happens an endothermic reaction and exists high-temperature $CO_2$ with sensible heat, the temperature of the reduction reaction device drops by about 100° C.

The chemical equations are as follows:

$$C+CO_2 \mathrel{=\!=\!=\!=} 2CO \qquad \text{(Equation 1)};$$

the $Fe_3O_4$ undergoes a reaction with reducing gas (mostly, CO) to produce $CO_2$, $H_2O$ and FeO, with chemical equations shown as follows:

$$Fe_3O_4+CO \mathrel{=\!=\!=\!=} 3FeO+CO_2 \qquad \text{(Equation 2)};$$

A carbon separator: the reduced FeO circulating particles are separated from carbonous particles (e.g., unburned coke and ash), the FeO is sent to a hydrogen production reaction unit, and the reaction syngas (mostly $CO_2$, with a small amount of $H_2O$) and the solid particles are lifted to a gas-solid separator. The reaction syngas is effectively separated from the carbonous particles, and the carbonous particles are captured and returned to the reduction reaction device through a feedback device to undergo the reaction with the recirculated high-temperature $CO_2$ (referring to Equation 1).

The high-temperature syngas at 900° C. from the gas-solid separator exchanges heat with water medium in a heat exchanging device. To be specific, on one hand, the reaction syngas is cooled to 200° C.; on the other hand, the water medium is heated to generate high-quality steam (at 540° C., 11.8 MPa) for production. A part of the cooled syngas is heated to 400° C. through a recirculation compressor and a secondary heat transfer device, and then sent to the reduction reaction device. The remaining syngas is sent to a cooling refinement device to obtain gaseous $CO_2$ with a purity of more than 95% for convenient capture and storage.

A hydrogen production reaction device: the FeO circulating particles at 900° C. from the carbon separator undergo an oxidation reaction with the steam heated by a tertiary heat transfer device to produce $H_2$ and $Fe_3O_4$. The hydrogen production reaction device conducts an exothermic reaction, and the temperature of the reduction reaction device rises by about 34° C. The chemical equation is as follows:

$$3FeO+H_2O \mathrel{=\!=\!=} Fe_3O_4+H_2 \qquad \text{(Equation 3)}.$$

The gas ($H_2$ and $H_2O$) is efficiently separated from the $Fe_3O_4$ through a secondary separation device, and the separated gas is sent to a cooling purification device to obtain a high-purity $H_2$ with a purity of more than 98%. In addition, the 934° C. $Fe_3O_4$ obtained by the secondary separation device is heated together with newly added $Fe_3O_4$ to 1000° C. by a primary heat transfer device and then sent to the reduction reaction device for circulation reaction.

For carbon-based fuel, the equation of the main integrated reaction is as follows:

$$C+2H_2O===2H_2+CO_2 \qquad \text{(Equation 4)};$$

The hydrogen production reaction between the carbon-based fuel and the steam is endothermic. Theoretically, it takes at least 102.6 KJ of heat energy to convert 1 mol C into 2 mol $H_2$. In this embodiment, solar energy is used to provide heat energy for the looping hydrogen production system, which achieves the conversion from 1 mol C into 2 mol $H_2$ and 1 mol $CO_2$, and effectively separates the $H_2$ from $CO_2$ in the syngas, thus greatly reducing the hydrogen production cost and facilitating the capture and storage of $CO_2$.

The present invention is not limited to the foregoing specific implementations. The present invention expands to any new feature or any new combination disclosed in the Description, and steps in any new method or process or any new combination disclosed.

The invention claimed is:

1. A looping reaction hydrogen production system, comprising:

a reduction reaction device in which a metal oxide (MeO) undergoes a reduction reaction with a CO-containing reducing gas generated by a reaction of high-temperature $CO_2$ with a carbon-based fuel to obtain a Me-containing solid product and a $CO_2$-containing gaseous product, wherein Me represents a metal;

a primary separation device that separates the solid product and the $CO_2$-gaseous product from the reduction reaction device to obtain the Me, carbonous particles, and a $CO_2$-containing reaction product syngas;

a hydrogen production reaction device that receives the Me from the primary separation device and oxidizes the Me with steam to obtain a MeO-containing solid product and an $H_2$-containing gaseous product;

a secondary separation device that separates the MeO-containing solid product and the $H_2$-containing gaseous product from the hydrogen production reaction device to obtain the MeO and the $H_2$-containing gaseous product;

a primary heat transfer device that receives the MeO from the secondary separation device and extraneous MeO, heating, and transporting to the reduction reaction device;

a cooling purification device that separates the $H_2$-containing gaseous product from the secondary separation device to obtain $H_2$;

a heat exchanging device connected to the primary separation device and cools the $CO_2$-containing reaction product syngas from the primary separation device and generates a high-temperature water/steam medium, wherein a first outlet of the heat exchanging device is connected to a cooling refinement device in which a first portion of the $CO_2$-containing reaction product syngas is processed to obtain $CO_2$, and wherein a second outlet of the heat exchanging device is connected to a recirculation compressor in which a second portion of the $CO_2$-containing reaction product syngas is pressurized and heated, and a secondary heat transfer device that receives the pressurized and heated $CO_2$-containing reaction product syngas from the recirculation compressor and generates the high-temperature $CO_2$.

2. The looping reaction hydrogen production system according to claim 1, wherein the primary separation device comprises a carbon separator and a primary gas-solid separator, the carbon separator is connected with the reduction reaction device to separate MeO from carbonous particles and the $CO_2$-containing reaction product syngas, and the primary gas-solid separator is connected with the carbon separator to separate the carbonous particles from the $CO_2$-containing reaction product syngas.

3. The looping reaction hydrogen production system according to claim 1, comprising a feedback device connected to the primary separation device and the reduction reaction device, wherein the feedback device receives carbon particles from the primary separation device and sends the carbon particles to the reduction reaction device.

4. The looping reaction hydrogen production system according to claim 1, further comprising a feed water pump and a tertiary heat transfer device connected with the feed water pump and the hydrogen production reaction device, wherein the tertiary heat transfer device heat water from the feed water pump to generate steam and sends the steam to the hydrogen production reaction device.

5. The looping reaction hydrogen production system according to claim 4, wherein the cooling purification device is connected to the feedwater pump, the feedwater pump receives extraneous water and condensate from the cooling purification device, and sends water to the tertiary heat transfer device as feed water.

* * * * *